(12) United States Patent
Chung et al.

(10) Patent No.: US 10,476,799 B2
(45) Date of Patent: Nov. 12, 2019

(54) SYSTEMS AND METHODS FOR LOAD BALANCING IN A DISTRIBUTED SOFTWARE DEFINED NETWORK PACKET CORE SYSTEM

(71) Applicant: Google LLC, Mountain View, CA (US)

(72) Inventors: Bok Knun Randolph Chung, Los Altos, CA (US); Hassan Sipra, San Jose, CA (US); Ankur Jain, Mountain View, CA (US)

(73) Assignee: Google LLC, Mountain View, CA (US)

( * ) Notice: Subject to any disclaimer, the term of this patent is extended or adjusted under 35 U.S.C. 154(b) by 324 days.

(21) Appl. No.: 15/270,862

(22) Filed: Sep. 20, 2016

(65) Prior Publication Data

US 2017/0085486 A1 Mar. 23, 2017

Related U.S. Application Data

(60) Provisional application No. 62/242,668, filed on Oct. 16, 2015, provisional application No. 62/242,677, (Continued)

(51) Int. Cl.
*H04L 12/803* (2013.01)
*H04L 29/06* (2006.01)
(Continued)

(52) U.S. Cl.
CPC .......... *H04L 47/125* (2013.01); *H04L 41/042* (2013.01); *H04L 41/044* (2013.01);
(Continued)

(58) Field of Classification Search
CPC ....... H04L 47/125; H04L 45/42; H04L 45/64; H04L 45/44; H04L 43/0817;
(Continued)

(56) References Cited

U.S. PATENT DOCUMENTS 8,521,905 B2 8/2013 Beliveau et al.
9,264,944 B1 2/2016 Brewer
(Continued)

FOREIGN PATENT DOCUMENTS

CN 102938910 A 2/2013
JP 2010081605 A 4/2010
(Continued)

OTHER PUBLICATIONS

International Search Report and Written Opinion dated Jan. 24, 2017 in PCT Application No. PCT/US2016/052676.
(Continued)

*Primary Examiner* — Michael A Keller
(74) *Attorney, Agent, or Firm* — McDermott Will & Emery LLP

(57) ABSTRACT

Systems and methods for balancing load in a distributed software defined network (SDN) packet core system include a stateless load balancer within a local SDN infrastructure instance of the distributed SDN packet core system receiving a data packet for processing by at least one of a plurality of SDN network function modules of local SDN infrastructure instance. The stateless load balancer can direct the data packet to a stateful load balancer residing on a first computing device, among the plurality of computing devices in the local SDN infrastructure instance. The stateful load balancer can determine a stateful data packet processing task to be applied to the data packet and determine a second computing device in the local SDN infrastructure instance for applying the determined stateful data packet processing task to the data packet. The stateful load balancer can then forward the data packet to the second computing device.

20 Claims, 3 Drawing Sheets

Related U.S. Application Data filed on Oct. 16, 2015, provisional application No. 62/222,406, filed on Sep. 23, 2015.

(51) Int. Cl.

| | | |
|---|---|---|
| *H04L 12/24* | (2006.01) | |
| *H04L 29/08* | (2006.01) | |
| *H04W 28/08* | (2009.01) | |
| *H04W 24/04* | (2009.01) | |
| *H04W 72/04* | (2009.01) | |
| *H04L 29/12* | (2006.01) | |
| *H04W 36/08* | (2009.01) | |
| *H04W 40/36* | (2009.01) | |
| *H04W 28/10* | (2009.01) | |
| *H04W 36/00* | (2009.01) | |
| *H04L 12/26* | (2006.01) | |
| *H04L 12/721* | (2013.01) | |
| *H04L 12/715* | (2013.01) | |
| *H04L 12/717* | (2013.01) | |
| *H04W 88/10* | (2009.01) | |
| *H04W 36/14* | (2009.01) | |
| *H04W 36/36* | (2009.01) | |

(52) U.S. Cl.
CPC ...... *H04L 41/0893* (2013.01); *H04L 43/0817* (2013.01); *H04L 45/42* (2013.01); *H04L 45/44* (2013.01); *H04L 45/64* (2013.01); *H04L 61/2007* (2013.01); *H04L 61/6022* (2013.01); *H04L 67/1004* (2013.01); *H04L 67/1029* (2013.01); *H04L 67/288* (2013.01); *H04L 69/22* (2013.01); *H04W 24/04* (2013.01); *H04W 28/08* (2013.01); *H04W 28/10* (2013.01); *H04W 36/00* (2013.01); *H04W 36/0011* (2013.01); *H04W 36/08* (2013.01); *H04W 40/36* (2013.01); *H04W 72/0426* (2013.01); *H04L 43/0852* (2013.01); *H04W 36/14* (2013.01); *H04W 36/36* (2013.01); *H04W 88/10* (2013.01)

(58) Field of Classification Search
CPC ............... H04L 41/044; H04L 41/0893; H04L 61/2007; H04L 61/6022; H04L 69/22; H04L 43/0852; H04W 36/0011; H04W 28/10; H04W 24/04; H04W 36/00; H04W 40/36; H04W 72/0426; H04W 36/08; H04W 36/14; H04W 36/36; H04W 88/10
See application file for complete search history.

(56) References Cited

U.S. PATENT DOCUMENTS

| | | | |
|---|---|---|---|
| 10,069,648 B2 | 9/2018 | Suzuki | |
| 2007/0053334 A1 | 3/2007 | Sueyoshi et al. | |
| 2007/0115906 A1 | 5/2007 | Gao et al. | |
| 2009/0094611 A1* | 4/2009 | Danne | G06F 9/5033 718/105 |
| 2009/0228589 A1* | 9/2009 | Korupolu | H04L 67/1097 709/226 |
| 2011/0044218 A1 | 2/2011 | Kaur et al. | |
| 2012/0106333 A1* | 5/2012 | Lee | H04L 47/125 370/230 |
| 2012/0204224 A1 | 8/2012 | Wang et al. | |
| 2012/0300615 A1 | 11/2012 | Kempf et al. | |
| 2013/0054761 A1* | 2/2013 | Kempf | H04L 12/4633 709/220 |
| 2013/0094472 A1 | 4/2013 | Klingenbrunn et al. | |
| 2013/0139243 A1 | 5/2013 | Poola et al. | |
| 2013/0242727 A1 | 9/2013 | Shaikh | |
| 2013/0272127 A1 | 10/2013 | Ali et al. | |
| 2013/0297798 A1* | 11/2013 | Arisoylu | H04L 67/1027 709/226 |
| 2013/0329601 A1 | 12/2013 | Yin et al. | |
| 2014/0038654 A1 | 2/2014 | Ahmadi | |
| 2014/0101726 A1 | 4/2014 | Gupta et al. | |
| 2014/0269284 A1 | 9/2014 | Amanna, III et al. | |
| 2014/0341199 A1 | 11/2014 | Jeon et al. | |
| 2014/0348130 A1 | 11/2014 | Kaippallimalil et al. | |
| 2015/0055623 A1 | 2/2015 | Li et al. | |
| 2015/0063346 A1 | 3/2015 | Eswara et al. | |
| 2015/0124622 A1 | 5/2015 | Kovvali et al. | |
| 2015/0124815 A1* | 5/2015 | Beliveau | H04L 45/38 370/392 |
| 2015/0200859 A1* | 7/2015 | Li | H04L 41/0823 370/235 |
| 2015/0382240 A1 | 12/2015 | Hecht et al. | |
| 2016/0085641 A1* | 3/2016 | Nagasubramaniam | H04L 41/0654 714/4.11 |
| 2016/0100340 A1 | 4/2016 | Kim et al. | |
| 2016/0127889 A1 | 5/2016 | Cui et al. | |
| 2016/0150448 A1 | 5/2016 | Perras et al. | |
| 2016/0156513 A1 | 6/2016 | Zhang et al. | |
| 2016/0182378 A1* | 6/2016 | Basavaraja | H04L 45/745 370/235 |
| 2016/0301595 A1 | 10/2016 | Ashida | |
| 2016/0315785 A1 | 10/2016 | Dronadula et al. | |
| 2016/0381146 A1 | 12/2016 | Zhang et al. | |
| 2018/0248713 A1 | 8/2018 | Zanier et al. | |

FOREIGN PATENT DOCUMENTS

| | | |
|---|---|---|
| JP | 2014531792 A | 11/2014 |
| JP | 2015008407 A | 1/2015 |
| JP | 2015146470 A | 8/2015 |
| JP | 2016524827 A | 8/2016 |
| WO | 2010057198 A1 | 5/2010 |
| WO | 2011037197 A1 | 3/2011 |
| WO | 2014209007 A1 | 12/2014 |
| WO | 2015009939 A1 | 1/2015 |

OTHER PUBLICATIONS

International Search Report and Written Opinion dated Dec. 1, 2016 in PCT Application No. PCT/US2016/052674.
Invitation to Pay Additional Fees And, Where Applicable, Protest Fee dated Dec. 1, 2016 in PCT Application No. PCT/US2016/052676.
International Search Report and Written Opinion dated Jan. 2, 2017 in PCT Application No. PCT/US2016/052679.
Li, Yuhong, et al. Software Defined Networking for Distributed Mobility Management, In 2013 IEEE Globecom Workshops, Dec. 2013, pp. 885-889, IEEE.
Morelli, Arianna. Final Architecture Design, Mar. 3, 2015, pp. 1-79, retrieved from URL: http://www.ict-crowd.eu/downloads/deliverable/CROWD_D1.3_V1.1.pdf.
Seite, Pierrick. Initial Specification of Connectivity Management Concepts and Architecture, Sep. 30, 2013, pp. 1-103, retrieved from URL: http://www.ict-crowd.eu/downloads/deliverable/CROWD_D4_1.pdf.
International Preliminary Report on Patentability under Chapter II dated Dec. 5, 2017 in International (PCT) Application No. PCT/US2016/052674.
Aricent, Demystifying Routing Services in Software-Defined Networking, (c) 2013 Aricent Group. Retrieved from http://www3.aricent.com/demystifying-routing-services-in-sdn-whitepaper/ on Sep. 20, 2016 (12 pages).
Aruba Networks, Aruba HybridControl™ Architecture for Service Providers (c) 2013 Aruba Networks, Inc. Retrieved from http://www.arubanetworks.com/pdf/solutions/TB_Aruba_HybridControl.pdf on Sep. 20, 2016 (12 pages).
Avaya, When SDN meets Mobility, (c) 2015 Avaya Inc. Retrieved from https://www.avaya.com/en/documents/when-sdn-meets-mobility-dn7711.pdf on Sep. 20, 2016 (6 pages).

(56) References Cited

OTHER PUBLICATIONS

Giust, Fabio, et al. HDMM: Deploying client and network-based Distributed Mobility Management, Telecommunication Systems, vol. 59, No. 2, pp. 247-270, Jun. 2015.

Heinonen, Johanna, et al. Dynamic Tunnel Switching for SDN-Based Cellular Core Networks. Retrieved from https://pdfs.semanticscholar.org/4120/2d4907550dfbec2096bb07997f6dba838f66.pdf on Sep. 20, 2016 (12 pages).

Heinonen, Johanna, et al. Dynamic Tunnel Switching for SDN-Based Cellular Core Networks, Proceedings of the 4th workshop on All things cellular: operations, applications, & challenges, ACM, pp. 27-32, Aug. 2014.

Hummel, Karin Anna. ATCN 2014: SDN-Mobility and SDN: Mobility Management and Mobile Networks. etrieved from http://docplayer.net/10260348-Atcn-2014-sdn-mobility-and-sdn-mobility-management-and-mobile-networks.html on Sep. 20, 2016 (18 pages).

Jain, Sushant, et al. B4: Experience with a globally-deployed software defined WAN, ACM SIGCOMM Computer Communication Review vol. 43, No. 4, pp. 3-14, Sep. 2013.

Lippis III, Nicholas John, A Software-Defined Networking Approach to Branch Office Routing, A Lippis Consulting Industry Paper, Feb. 2013. Retrieved from http://www.cisco.com/c/dam/en/us/products/collateral/unified-communications/hosted-collaboration-solution-hcs/cloud_connector_sdn.pdf on Sep. 20, 2016 (8 pages).

Liu, D. L., et al. Cloud Based Mobile Core Network Problem Statement, Network Working Group. Retrieved from https://tools.ieff.org/id/draft-liu-dmm-deployment-scenario-01.html on Sep. 20, 2016 (6 pages).

Mevico Celtic Telecommunications Solutions, Advanced EPC Architecture for Smart Traffic Steering, Document Identifier D2.2, Jan. 31, 2013. Retrieved from http://citeseerx.ist.psu.edu/viewdoc/download?doi=10.1.1.464.9537&rep=rep1&type=pdf on Sep. 20, 2016 (93 pages).

Vanbever, Laurent, On integrating Software-Defined Networking within existing routing systems, Stanford University Networking Seminar, Nov. 13, 2013. Retrieved from http://netseminar.stanford.edu/seminars/11_13_13.pdf on Sep. 20, 2016 (97 pages).

Office Action dated Mar. 20, 2018 in United Kingdom Patent Application No. 1801422.5.

Office Action dated Jun. 28, 2018 in Australian Patent Application No. 2016325529.

Office Action dated Sep. 18, 2018 in Japanese Patent Application No. 2017-566111.

Office Action dated Sep. 25, 2018 in Japanese Patent Application No. 2018-504191.

Office Action dated Oct. 19, 2018 in U.S. Appl. No. 15/270,846.

Office Action dated Aug. 28, 2018 in U.S. Appl. No. 15/270,831.

Office Action dated Oct. 23, 2018 in Japanese Patent Application No. 2018-504266.

Extended European Search Report dated Oct. 24, 2018 in European Patent Application No. 16849427.6.

Office Action dated Nov. 7, 2018 in Korean Patent Application No. 10-2018-7005319.

Office Action dated Dec. 6, 2018 in Korean Patent Application No. 10-2018-7005477.

Office Action dated Mar. 1, 2019 in U.S. Appl. No. 15/270,831.

Examination Report dated Apr. 24, 2019 in United Kingdom Patent Application No. 1801422.5.

Office Action dated Jun. 3, 2019 in U.S. Appl. No. 15/270,846.

Office Action dated Apr. 26, 2019 in Singapore Patent Application No. 11201801018V.

Notice of Allowance dated Jun. 25, 2019 in U.S. Appl. No. 15/270,831.

\* cited by examiner

SYSTEMS AND METHODS FOR LOAD BALANCING IN A DISTRIBUTED SOFTWARE DEFINED NETWORK PACKET CORE SYSTEM

CROSS-REFERENCE TO RELATED APPLICATIONS

This application claims priority to U.S. Provisional Application No. 62/222,406, filed Sep. 23, 2015, entitled "DISTRIBUTED SOFTWARE DEFINED WIRELESS PACKET CORE SYSTEM"; U.S. Provisional Application No. 62/242,668, filed Oct. 16, 2015, entitled "SYSTEMS AND METHODS FOR MOBILITY MANAGEMENT IN A DISTRIBUTED SOFTWARE DEFINED NETWORK PACKET CORE SYSTEM"; and U.S. Provisional Application No. 62/242,677, filed Oct. 16, 2015, entitled "SYSTEMS AND METHODS FOR LOAD BALANCING IN A DISTRIBUTED SOFTWARE DEFINED NETWORK PACKET CORE SYSTEM," the contents of all of which are incorporated herein by reference.

FIELD OF THE DISCLOSURE

The present disclosure relates generally to the field of wireless communication networks.

BACKGROUND

More users are switching to (or are more often using) mobile networks to access the Internet or to communicate with other users. Since many mobile devices are equipped with communication capabilities associated with a variety of radio access technologies, users have the flexibility to switch between distinct radio access networks based, for instance, on availability, cost, network performance or a combination thereof.

SUMMARY

According to at least one aspect of this disclosure, a distributed software defined network (SDN) packet core system can include a plurality of interconnected local SDN infrastructure instances such that each local SDN infrastructure instance includes a cluster of computing devices arranged geographically in proximity, and communicatively coupled, to a respective plurality of radio access points. Each local SDN infrastructure instance can include a plurality of SDN network function modules representing instances of network functions executable by one or more of the computer devices, a stateless load balancer and a plurality of stateful load balancing modules. The stateless load balancer can be configured to receive data packets for processing by at least one of the network functions and direct the data packets to one of the computing devices in the local SDN infrastructure instance. Each stateful load balancing module can be residing in a respective computing device and can be configured to (1) determine a stateful data packet processing task to be applied to a data packet received at the respective computing device, (2) determine a computing device in the local SDN infrastructure instance for applying the determined stateful data packet processing task to the data packet and (3) forward the data packet to the determined computing device. Each local SDN infrastructure instance can also include a load manager configured to manage information indicative of load and operational states of the computing devices and the plurality of SDN network function modules in that local SDN infrastructure instance.

According to at least one aspect of this disclosure, a method of balancing load in a distributed software defined network (SDN) packet core system includes receiving, by a stateless load balancer within a local SDN infrastructure instance of the distributed SDN packet core system, a data packet for processing by at least one of a plurality of SDN network function modules. The plurality of network function modules are executable on a plurality of computing devices of local SDN infrastructure instance. The method also includes the stateless load balancer directing the data packet to a stateful load balancer residing on a first computing device, among the plurality of computing devices in the local SDN infrastructure instance. The method also includes the stateful load balancer determining a stateful data packet processing task to be applied to the data packet, determining a second computing device in the local SDN infrastructure instance for applying the determined stateful data packet processing task to the data packet, and forwarding the data packet to the second computing device.

DETAILED DESCRIPTION

Figure 1:
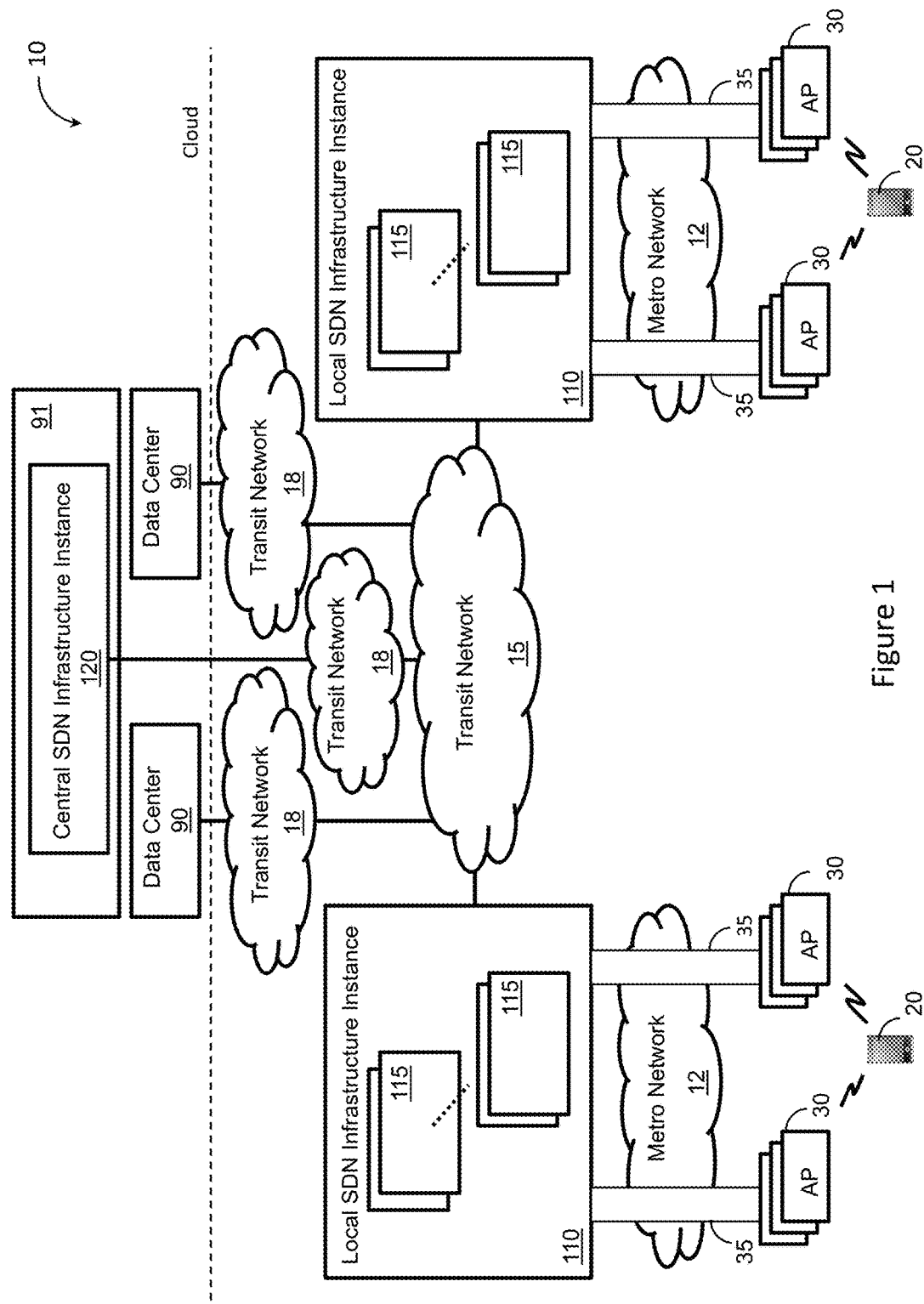
FIG. 1 shows a block diagram illustrating an overview of a communication environment employing a distributed software defined network (SDN) packet core system.

Increasing numbers of mobile users and increasing volumes of mobile data traffic call for continuous and costly investments in network infrastructure by mobile network operators. Mobile users are more frequently accessing content provider data through a variety of wireless access networks. Mobile devices can be equipped with capabilities for accessing different radio access networks associated with different radio access technologies (RATs) such as $3^{rd}$ generation (3G) mobile telecommunications technology, long-term evolution (LTE) mobile telecommunications technology, WiFi, proprietary high-altitude platforms or other radio access technologies.

When accessing the Internet, a mobile user can switch between different modes of connectivity depending on a respective user context. For instance, the mobile user can access the Internet through WiFi at home, through cellular access networks outdoors or through guest WiFi services in retail spaces, airports or other public places. Users usually have different ways to authenticate themselves to distinct access networks, different billing arrangements and different security guarantees or policies. Also, roaming between distinct access networks results in connectivity interruption. These factors lead to a fragmented user experience. Mobile users would appreciate a unified service that provides a combination of heterogeneous radio access solutions with seamless mobility between various RATs.

One of the ways to improve user experience is to provide a hierarchical system architecture that enables cohesion of heterogeneous radio access networks into a single service domain. In designing such system architecture, different factors are to be considered, including system scalability (e.g., with respect to new RATs or with respect increase in network capacity), system complexity, infrastructure cost, intra-RAT mobility and inter-RAT mobility. Implementing such interworking solutions can be complex and can also hinder the scalability of the system architecture with respect to new RATs. A distributed and hierarchical packet core system architecture can allow for improvement (over existing packet core systems) with respect to these factors. In particular, a hierarchical packet core system can be arranged such that network functions that are global in nature and relatively less latency sensitive (e.g., compared to other network functions) are implemented as cloud-based software defined network (SDN) functions, and network functions that are local in nature and latency sensitive are implemented within regional pods (or computing domains) in close proximity to their served access networks (or respective radio access points). A regional pod can include a cluster of computing devices with network functional blocks implemented thereon and can be configured to serve a respective geographical area. Each regional pod can include multiple instances of one or more network functional blocks to allow for increased capacity and parallel processing.

In such a distributed and hierarchical deployment, one of the problems to be solved is how to route control plane and data plane traffic between the various regional pods, the respective computing devices and/or the respective network functional blocks. Control plane traffic includes messages used to signal the establishment of a user session, for instance, between a radio access point and the packet core system and routing information for directing data-plane traffic through the packet core system. Data plane traffic includes data packets that are exchanged between user devices and the Internet (or another user device) and are tunneled through the packet core system. Routing control plane and data plane traffic includes balancing the processing loads of various regional pods, respective computing devices and/or respective network computational blocks. In this disclosure, hierarchical load balancing systems and load balancing methods are configured for balancing processing load in a distributed software defined network (SDN) packet core system.

FIG. 1 shows a block diagram illustrating an overview of a communication environment 10 employing a distributed software defined network (SDN) packet core system. The communication environment 10 can include a plurality of radio access points (APs) 30 serving mobile devices 20 in their proximity, a plurality of local SDN infrastructure instances 110 (also referred to herein as regional pods 110), a central SDN infrastructure instance 120, one or more metropolitan area networks 12, a first transit network 15, one or more second transit networks 18 and one or more data centers 90. Each local SDN infrastructure instance 110 can include a plurality of computer devices 115 configured to execute network functions for serving mobile devices 20 in the proximity of that SDN infrastructure instance 110.

The mobile devices 20 includes without limitation a mobile phone, smart phone, tablet, laptop, smart watch, wearable item with communications capabilities, audio playing device (such as an MP3 player), video playing device, gaming device, global positioning system (GPS) device, automotive computer or any other client device with communication capabilities. The mobile device 20 can attach to a mobile access network via wireless links at respective access points 30. In some implementations, the mobile device 20 can be configured to request and access content associated with a content provider network via the distributed SDN packet core system. For instance, an application (such as a browser, media player, game application/platform, email application, enterprise application, social media application, cloud application or the like) running on the mobile device 20 can request content available from a data center 90 for display on a screen of the mobile device 20.

The radio access points (APs) 30 can be configured to communicate with mobile devices 20 via wireless links. The APs 30 can be part of separate radio access networks (such as a WiFi hotspot network, universal mobile telecommunications system (UMTS) network, long-term evolution (LTE) network or any other mobile communication network) associated with at least one radio access technology (RAT) such as 3G, LTE, LTE-A, Wi-Fi or other RATs. For instance the APs 30 can include a Node B, evolved Node B (eNode B), WiFi hotspot access point or radio access points of other types. The APs 30 can be distributed over a large geographical area defining one or more states, a country or multiple countries. Each AP 30 can be configured to serve mobile devices 20 in a respective geographical neighborhood. Each AP 30 can be configured to communicate directly with mobile devices 20 in its neighborhood through an air interface and can be coupled to a respective local SDN infrastructure instance 110 through a metro ISP network 12. As a mobile device 20 moves from one geographical location to another, the respective wireless connection can be transferred (or handed over) from one AP 30 to another based on the proximity of the mobile device 20 to distinct APs 30.

The plurality of local SDN infrastructure instances 110 represent a set of distributed computing or network processing resource pools deployed in close proximity to and serving radio access networks or the APs 30 thereof. For instance, each SDN infrastructure instance 110 can be associated with a respective metropolitan area and can be coupled to APs 30 serving mobile devices 20 within that metropolitan area. Each local SDN infrastructure instance 110 can include a respective plurality (such as a dozen, few dozens, or other number) of computer devices 115, such as computer servers or racks of servers configured to carry out network operations or functions implemented as SDN elements to serve data traffic associated with APs 30 coupled (or served) by that local SDN infrastructure instance 110. In some implementations, the computer devices 115 associated with a respective local SDN infrastructure instance 110 can be configured to carry out latency sensitive network functions. For instance, control-plane signaling, data plane anchoring and mobility operations can be implemented as SDN elements executable by (or running on) the respective computer devices 115.

In some implementations, each local SDN infrastructure instance 110 can include load balancing entities configured to balance the load between the respective computer devices 115 or the SDN elements running thereon. In some implementations, each local SDN infrastructure instance 110 can be configured to locally cache Internet data associated with one or more content providers, cloud data, intranet data or a combination thereof. For instance, each local SDN infrastructure instance 110 can include one or more caching servers. The local SDN infrastructure instance 110 can be configured to serve Internet data in response to requests from mobile devices 20 from local caches whenever the requested Internet data is locally cached. Internet data can include webpages, data associated with online services (such as email, social media, etc.), data associated with games, video streaming data (such as Netflix or YouTube), or the like. In some implementations, the local SDN infrastructure instances 110 can be configured to locally cache (and serve) Internet data, intranet data, cloud data or a combination thereof.

The central SDN infrastructure instance 120 can include one or more computer devices with SDN elements running thereon and configured to carry out network functions that are not (or are at least less) latency sensitive or network functions involving multiple local SDN infrastructure instances 110. The SDN elements running in the central SDN infrastructure instance 120 can include, for instance, a subscription policy module, a global module for managing mobility (or roaming) between local SDN infrastructure instances 110 or a combination thereof. The subscription policy module can include an authorization, authentication and accounting (AAA) server, subscription profile repository (SPR), policy and charging control module or other module for managing subscription policies. During attachment of a mobile device 20 to the distributed SDN packet core system, a local SDN infrastructure instance 110 can request authentication or authorization of a mobile device 20 (or a user thereof) from a subscription and policy module associated with the central SDN infrastructure instance 120. The central SDN infrastructure instance 120 also can include a global load balancing module for balancing load between the plurality of local SDN infrastructure instances 110. The central SDN infrastructure instance 120 can be arranged in the cloud, such as in a host data center 91.

Each local SDN infrastructure instance 110 can be coupled to APs 30 in its proximity through a respective metropolitan area network 12. The metropolitan area networks 12 can differ from one local SDN infrastructure instance 110 to another. In some implementations, a local SDN infrastructure instance can be coupled to respective APs 30 through one or more metropolitan area networks 12. For a given local SDN infrastructure instance 110, the respective metropolitan area network(s) 12 can be one or more communication networks serving a metropolitan area associated with that local SDN infrastructure instance 110. In some implementations, one or more of the metropolitan area networks 12 can be owned or managed by respective third-party network providers and may not be part of the distributed SDN packet core network. In some implementations, one metropolitan area network 12 can serve multiple local SDN infrastructure instances 110. In some implementations, each AP 30 can be coupled to (and served by) the geographically closest local SDN infrastructure instance 110. In some implementations, coupling between the APs 30 and entities (such as computer devices 115 or SDN element(s) running thereon) within the local SDN infrastructure instance 110 can be achieved through respective transport tunnels 35 over the metropolitan area network(s) 12. For instance, transport tunnels 35, such as Ethernet-over-IP (EoIP) tunnels, can be used over metropolitan area networks 12 that provide IP connectivity to local SDN infrastructure instances 110. In some implementations, the transport tunnels 35 can include an Ethernet-over-IP tunnel, generic user datagram protocol (UDP) encapsulation (GUE) tunnel, generic route encapsulation (GRE) tunnel, 802.11 over GUE tunnel, GPRS tunneling protocol (GTP) tunnel, Internet Protocol (IP) security (IPSec) tunnel, other type of tunnel or a combination thereof.

In some implementations, the plurality of local SDN infrastructure instances 110 can be inter-connected through a first transit network 15. The first transit network 15 allows for communication between separate local SDN infrastructure instances 110, for instance, to handle mobility (or roaming) and signaling between local SDN infrastructure instances 110. In some implementations, the first transit network 15 can be configured to couple the local SDN infrastructure instances 110 to the central infrastructure instance 120. The first transit network 15 can include a fiber-optic data network, an Internet service provider (ISP) network or other communication network. The first transit network 15 and the plurality of local SDN infrastructure instances 110 can be managed (or owned) by a single entity or separate entities. In some implementations, the first transit network 15 can be owned or managed separately from the local SDN infrastructure instances 110. That is, the first transit network 15 may not be part of the distributed SDN packet core system but rather an external network used to communicatively couple the local SDN infrastructure instances 110 to each other.

The communication environment 10 can include a plurality of data centers 90. Each data center 90 can include computing devices for storing and providing access to content provider data, web pages, cloud data or a combination thereof. For instance, the data centers 90 can be configured to receive data requests from the local SDN infrastructure instances 110 and, in response, provide the requested data. The data centers 90 can be configured to host web pages and respective content, video streaming applications such as YouTube or Netflix, social media applications and content, gaming applications, enterprise applications or any other cloud applications or services. In some implementations, the central SDN infrastructure instance(s) 120 can be implemented within the host data center 91.

Each local SDN infrastructure instance 110 can be communicatively coupled to the data centers 90 through one or more second transit networks 18. The second transit network(s) 18 can be coupled to the local SDN infrastructure instances 110 through the first transit network 15. In some implementations, the second transit network(s) 18 can be directly coupled to the local SDN infrastructure instances 110. In some implementations, the second transit network(s) 18 can be configured to couple the central SDN infrastructure instance 120 to the local infrastructure instances 110. In some implementations, the second transit network(s) 18 can be optional. In such implementations, the data centers 90 can be directly coupled to the first transit network 15. In some implementations, the first and second transit networks 15 and 18 can be part of a single communications network.

In some implementations, the distributed SDN packet core system can be viewed as the combination of the local SDN infrastructure instances 110 and the central SDN infrastructure instance 120. In some implementations, the distributed SDN packet core system can also include the first transit network 15. In some implementations, the distributed SDN packet core system can also include the second transit network(s) 18. The architecture of the distributed SDN packet core system (as described with respect to FIG. 1) allows for data traffic to be routed and broken-out locally, for instance, at the local SDN infrastructure instances 110. Arranging local SDN infrastructure instances 110 at close proximity to APs 30 and processing data traffic therein allows for fast data packet processing and therefore improved performance and reduced network resources consumption.

The distributed SDN packet core system can be widely distributed across a large geographical area (such as one or more states or one or more countries) and configured to track and manage mobility of a large number of mobile devices 20 distributed over the large geographical area. Mobility tracking and management can be carried out by SDN-based mobility functions implemented within the distributed SDN packet core system. Software implementation of mobility functions allows for the scalability and optimization of such functions. However, latency and scalability associated with the mobility functions can depend on the respective software implementation employed. For instance, when employing Network Function Virtualization (NFV) to implement separate mobility functions (such as the mobility management entity (MME) for LTE) for distinct RATs in the cloud (such as in data center(s) 90 or 91), scalability for a given RAT is usually achieved by replicating all mobility functions associated with that RAT. Replicating highly complex functions associated with large amounts of maintained states can lead to inefficient use of power and computational resources, especially if increased mobility processing resources are needed within a subset of the local SDN infrastructure instances. Also, replicating mobility functions would call for the synchronization of respective states, therefore further increase the complexity of the packet core system. Furthermore, implementing the mobility functions in the cloud can result in high mobility processing latency. In particular, while local SDN infrastructure instances 110 may be arranged in proximity to population centers (associated with large congregations of users or respective mobile devices 20), data centers (such as data centers 90 and 91) tend to be located in remote geographic locations. Accordingly, in the case where mobility functions are implemented in the cloud, processing of each mobility event involves signaling over long communication links between the data center 91 and one or more local SDN infrastructure instances 110.

In the current disclosure, a hierarchical load balancing model (LB model) is employed for routing control plane (C-plane) and data plane (D-plane) traffic between different entities of the communication environment 10 and load balancing between the SDN infrastructure instances 110 and the respective computer devices 115 or the SDN elements running thereon the computer devices 115 and SDN within the distributed SDN packet core system. The hierarchical LB model can be configured to apply coarse grained LB between the various SDN infrastructure instances 110 and apply fine grained load balancing, within each SDN infrastructure instance 110, between the computer devices 115 and SDN elements in that SDN infrastructure instance 110. The LB model also can allow for resiliency when an entire SDN infrastructure instance 110 fails or is administratively taken out of service.

Figure 2:
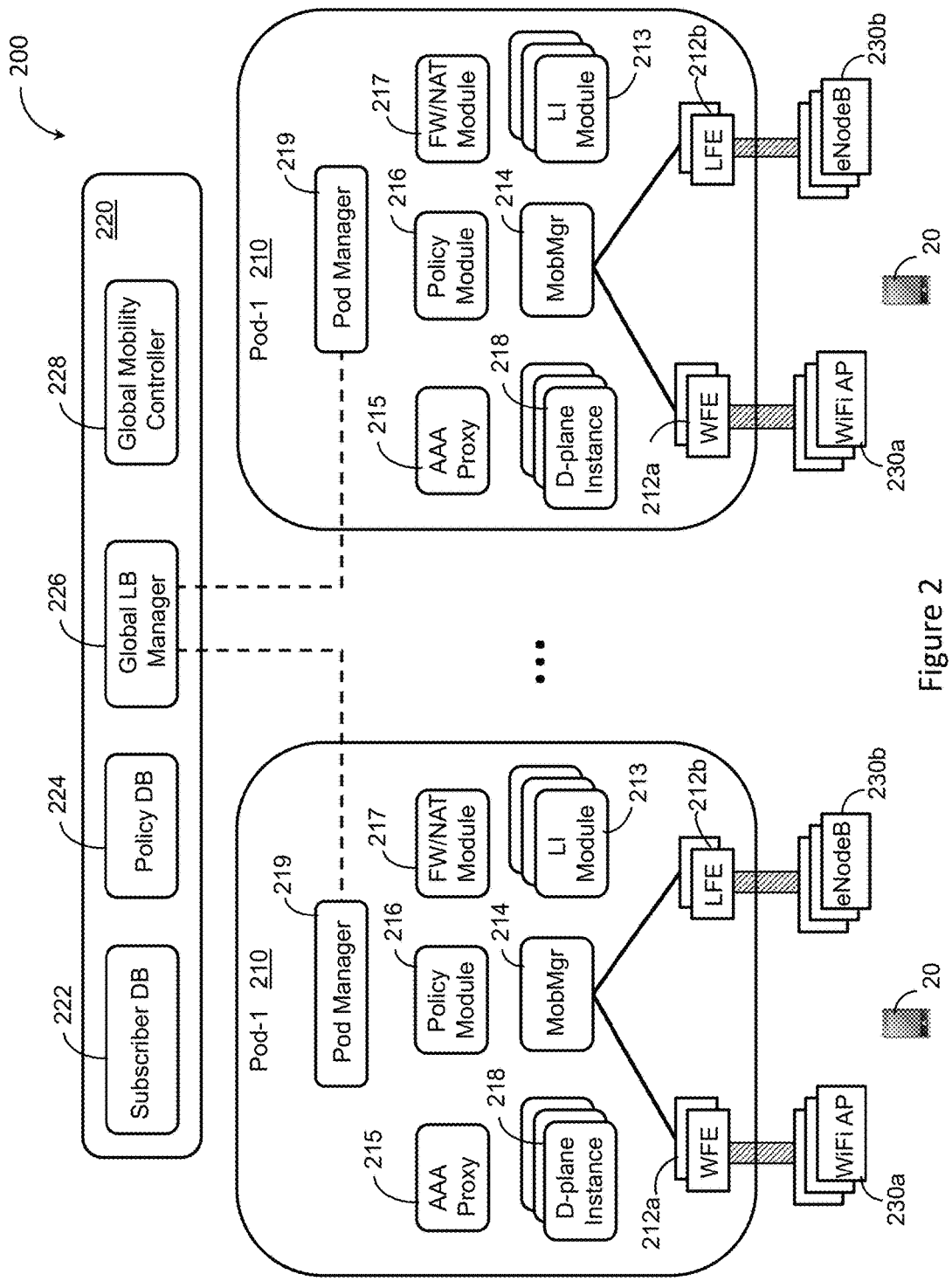
FIG. 2 is a block diagram illustrating SDN elements associated with a distributed SDN packet core system.

FIG. 2 is a block diagram illustrating the SDN elements associated with a distributed SDN packet core system 200. The distributed SDN packet core system 200 includes a cloud-based central SDN infrastructure instance 220 and a plurality of local SDN infrastructure instances 210 (also referred to as regional pods 210). The cloud-based central SDN infrastructure instance 220 includes a subscriber database (subscriber DB) 222, a global SDN mobility controller 224, a global load balancing module 226 can a policy database (policy DB) 228. Each regional pod 210 includes a plurality of WiFi front-end (WFE) modules 212a, a plurality of LTE front-end modules 212b, an authentication, authorization and accounting (AAA) proxy module 215, a policy module 216, a firewall/network address translation (FW/NAT) module 217, a lawful interceptor module 213, a plurality of D-plane application instances 218, a mobility manager 214 and a pod LB manager 219. Each WFE module 212 is communicatively coupled to and serves one or more WiFi APs 230a. Each LFE module 212 is communicatively coupled to and serves one or more eNodeBs 230b.

Different functions of the distributed packet core system 200 have characteristics that call for different distribution strategies. Certain network functions or modules such as the subscriber database 222, the policy database 224, the global LB module 226 and the global SDN mobility controller 22 are global in nature and can take advantage of the low cost computing and storage afforded in a large, centralized data center. As a result, such functions (or modules) are arranged to reside at the cloud-based central SDN infrastructure instance 220. Packet processing functions, however, are latency sensitive and can benefit from being deployed as close to the RAT-specific APs 230 as possible. Also, local mobility events (i.e., mobility events occurring within a single regional pod 210) can be handled more efficiently through local mobility functions residing in the regional pods 210 rather than through cloud-based mobility functions. By employing local mobility functions, the regional pods 210 can be arranged such that most (such as 85%, 90%, 95% or other percentage) of user mobility events are handled as local mobility events. For instance, each regional pod 210 can be arranged to serve a respective metropolitan area and mobile devices 20 associated with users residing in that metropolitan area can attach to the regional pod 210 serving that metropolitan area and can associate with that regional pod 210 as a respective home-pod. In the distributed SDN packet core system 200, latency sensitive network functions and network functions of local nature are arranged to reside within the regional pods 210 rather than in the cloud.

The subscriber database 222 can maintain information related to subscriber users of the distributed packet core system 200, such as user identifications, device identifications, user/device authorization information, user/device authentication information, user/device accounting information or a combination thereof. The policy database 224 can maintain information indicative of the policies to be applied to communications (or sessions) associated with each subscriber user or respective device. Both the subscriber database 222 and the policy database 224 can be configured to receive and respond to queries from various regional pods 210.

The global LB module 226 is configured to route requests for control plane or data plane processing to the regional pods 210. The global LB module 226 is also configured to balance processing/computational load between the regional pods 210. The global SDN mobility controller 228 is configured to track inter-pod mobility events (i.e., events where a mobile device 20 roams between two APs 230 associated with separate regional pods 210) and inform various regional pods of such mobility events.

Each regional pod 210 is configured to serve a plurality of WiFi APs 230a and eNodeBs 230b (referred to herein in general as RAT-specific APs 230). In general, each regional pod 210 can be configured to serve a respective plurality of RAT-specific APs 230 associated with at least one RAT. The RAT-specific APs 230 can include WiFi APs (or WiFi hotspot APs) 230a, evolved nodes B (eNodeB) 230b associated with LTE, Nodes B (NodeB) associated with 3G networks, other radio access points or a combination thereof. That is, while FIG. 2 shows Wi-Fi APs 230a and eNodeBs 230b, in general, the distributed SDN packet core system 200 can serve any combinations of APs 230. Also, while FIG. 2 shows the regional pods 210 to include WFE modules 212a and LFE modules 212b, in general, each regional pod 210 can include a plurality of RAT-specific FE modules 212 associated with at least one RAT. The RAT-specific FE modules 212 can include WFE modules 212a, LFE modules, 3rd Generation (3G) FE modules (for serving NodeBs), FE modules associated with other RATs or a combination thereof.

A mobile device 20 can attach to the distributed SDN packet core system 200 via one of the RAT-specific APs 230. For instance, the mobile device 20 can attach to a given RAT-specific AP 230 associated with a given RAT based on, for instance, signal strength, communication cost or user subscription with respect to each RAT supported by the regional pod 210. Each RAT-specific AP 230 associated with a given RAT can be communicatively coupled to a RAT-specific FE module 212 associated with that RAT through the metropolitan area network 12 (shown in FIG. 1). For instance, the WiFi APs 230a served by a regional pod 210 can be communicatively coupled to WFE modules 212a in that regional pod 210. Similarly, eNodeBs 230b served by the regional pod 210 can be communicatively coupled to LFE modules 212b of that LMD 210. In general, each of at least two LMDs 210 in the distributed SDN packet core system include RAT-specific FE modules 212 that are associated with one or more RATs.

In some implementations, each RAT-specific FE module 212 can be configured to communicate with a RAT-specific AP 230 via one or more overlay transport tunnels 235. For instance, each WFE module 212a can be configured to communicate with a WiFi AP 230a via an Ethernet-over-IP (EoIP) tunnel. Using the EoIP tunnel, the WiFi AP 230a can autonomously tunnel data, such as UE 802.3 frames, to the WFE module 212a. In some implementations, the overlay transport tunnel 235 coupling a RAT-specific AP 230 to a respective RAT-specific FE module 212 can include a Generic UDP Encapsulation (GUE) tunnel, Generic Route Encapsulation (GRE) tunnel, Ethernet-over-GRE tunnel, 802.11-over-GUE tunnel, general packet radio service (GPRS) Tunneling Protocol (GTP) tunnel, Internet Protocol security (IPSec) tunnel or other communication tunnel. The RAT-specific FE modules 212 are configured to handle intra-RAT intra-pod mobility events. That is, each RAT-specific module 212 associated with a corresponding RAT within a given regional pod 210 is configured to handle mobility events between RAT-specific APs 230 associated with that RAT and served by the given regional pod 210. In some implementations, each RAT-specific FE module 212 can be configured to maintain a list of layer-two (L2) bindings that map each mobile device 20 served by that RAT-specific FE module 212 to the RAT-specific AP 230 serving that mobile device 20. In particular, the L2 bindings can include device identification (device-ID) and serving AP identification (serving-AP-ID) pairings. In some implementations, the device-ID can include the media access control (MAC) address of the mobile device 20 and the serving-AP-ID can include a tunnel end-point identification (TEID) associated with the respective RAT-specific AP 230. In some implementations, each RAT-specific FE module 212 can include a RAT C-plane application for handling intra-RAT intra-pod mobility events and a RAT D-plane application for forwarding data packets tunneled through that RAT-specific FE module 212. A RAT D-plane application associated with a respective RAT-specific FE module 212 can employ a respective L2 forwarding database (FDB) for forwarding data packets tunneled through that RAT-specific FE module 212.

Each regional pod 210 includes a mobility manager 214 configured to handle inter-RAT or inter-pod mobility events (also referred to as layer-3 (L3) mobility events). L3 mobility can be anchored at the mobility manager 214. The mobility managers 214 are also configured to act as Internet Protocol (IP) anchors for mobiles devices 20 served by the distributed SDN packet core system 200. In particular, each mobility manager 214 can maintain bindings between L3 UE identifiers (such as IP addresses) and identifiers (such as IP addresses) of respective serving RAT-specific FE modules 212. Each mobility manager 214 can include one or more mobility gateway C-plane applications configured to handle L3 mobility events and update forwarding rules maintained by the mobility manager 214 and one or more mobility gateway D-plane applications configured to act as data forwarding entities using the L3 forwarding rules maintained at the mobility manager 214. A mobility gateway D-plane application associated with the mobility manager 214 can employ a respective L3 FDB for forwarding data packets tunneled through the mobility manager 214. The L3 FDB can include, for each mobile device 20 served by the distributed SDN packet core system 200, the respective IP address mapped to the IP address of the respective serving RAT-specific FE module 212.

Each regional pod 210 includes a plurality of D-plane application instances 218 configured to handle forwarding of data packets tunneled through that regional pod 210. While the D-plane application instances 218 are shown in FIG. 1 as being separate of the RAT-specific FE 212 and the mobility manager 214, the D-plane application instances 218 can include RAT D-plane applications 218 associated with the RAT-specific FE modules 212 and mobility gateway D-plane applications associated with the mobility manager 214.

Each regional pod 210 includes an authentication, authorization and accounting (AAA) proxy module 215 configured to obtain user subscriber data from the subscriber database 222 and employ such data to authenticate, authorize or charge a user or a respective mobile device 20. The regional pod 210 also includes the policy module 216, which is configured to obtain user policy information from the policy database 224 and cause user policies to be applied to communications associated with a respective user or a respective mobile device 20. In some implementations, a regional module 210 can include multiple instances of the AAA proxy module 215 or the policy module 216.

Each regional module 210 includes a FW/NAT module 217 configured to apply firewall security procedures, for instance, to data packets associated with a subnetwork or a given group of users. In some implementations, a regional pod 210 can include a plurality of instances of the FW/NAT module 217. Also, each regional module 210 includes a plurality of lawful interceptor modules 213 configured to intercept data packets and retrieve respective header or even content information.

Each regional pod 210 also includes a pod LB manager 219 configured to maintain information indicative of health states and processing loads for various computer devices and various SDN elements in that regional pod 210. The pod LB manager 219 can also be configured to communicate information indicative of the overall health state and processing load of the respective regional pod 210 to the global LB module 226 residing in the cloud-based central SDN infrastructure instance 220.

The distributed architecture of the distributed SDN packet core system 200 and the redundancy in instances of many SDN elements can allow for improved robustness and resilience of the distributed SDN packet core system 200. That is, if a regional pod 210 or a computing device 115 are down or non-operational, other regional pod(s) 210 or other computing device(S) 115 can be configured to carry the load of the non-operational entity. Also, the redundancy in instances of the many SDN elements (such as the RAT-specific FE modules 212, the LI modules 213 or the D-plane instances 218) can allow for distributing respective processing loads instead compared to single instance SDN elements that may result in processing bottlenecks. In order to make the most of such architecture, a hierarchical and scalable load balancing mechanism is employed to balance processing load across regional pods 210 and/or across computing devices 115 within each regional pod 210.

Figure 3:
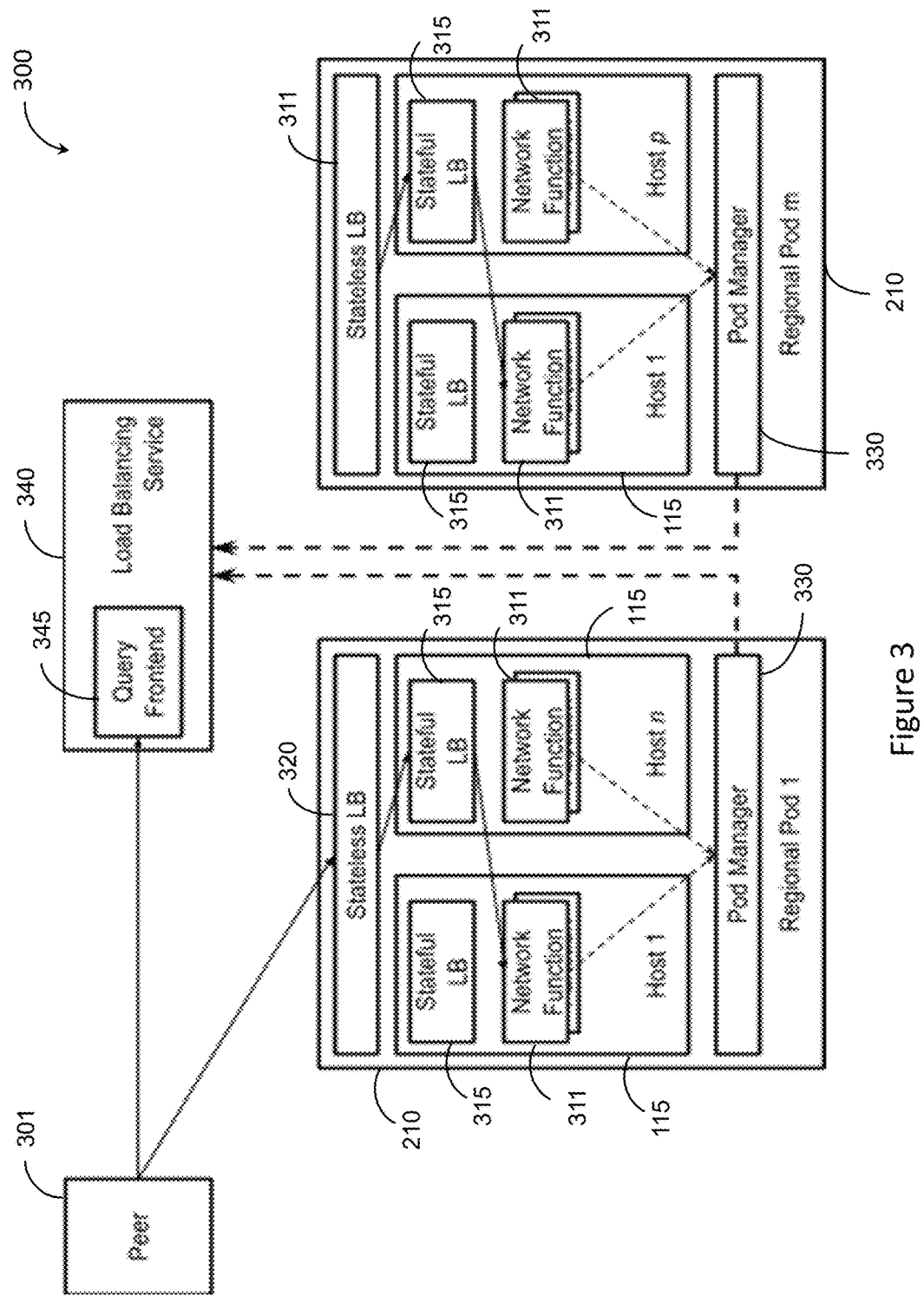
FIG. 3 is a block diagram illustrating a load balancing system for balancing processing load in the distributed SDN packet core system shown in FIG. 2.

FIG. 3 is a block diagram illustrating a load balancing (LB) system 300 and a respective LB mechanism for balancing processing load in the distributed SDN packet core system 200 shown in FIG. 2. The LB system 300 includes a global SDN LB module 340 residing in the cloud and including a LB query front-end module 345. The LB system 300 also includes, in each regional pod 210, a stateless LB module 320, a pod LB manager 330 and a plurality of stateful LB modules 315. As illustrated in further detail below, the LB mechanism can be viewed as two-level LB process.

Referring to FIGS. 2 and 3, a peer device 301, such as a RAT-specific AP 230, or another network element associated with the distributed SDN packet core system 200 can be configured to discover a network function instance of the distributed SDN packet core system 200 based on service IP addresses advertised by the regional pods 21 of the distributed SDN packet core system 200. For example, the peer device 301 can be an eNodeB 230b or Wi-Fi AP 230a attempting to discover a mobility controller (or a mobility function thereof) running in the distributed SDN packet core system 200.

In some implementations, each regional pod 210 can be configured to expose (or advertise) a number of service IP addresses externally. In some implementations, the advertised IP addresses for a given regional pod 210 do not necessarily reflect the number of computing devices 115 of that regional pod 210. By disassociating the number of advertised IP addresses from the number of computing devices 115, internal health and operational states (such as a maintenance event) of the respective computing devices 115 in each regional pod 210 can be obscured from peer device 301. For example if a computing device 115 in a respective regional pod 210 is taken out of service due to a scheduled event (e.g. software upgrade) or an unscheduled event (e.g., hardware failure), the IP address that the peer device 301 uses to connect to that regional pod 210 does not need to change. In some implementations, the number of IP addresses advertised for each regional pod 210 is typically much smaller than (e.g., one IP address) the number of computing devices 115 in the regional pod 210.

In some implementations, the global LB module 340 is configured to allow peer devices 301 to locate a specific regional pod 210. In particular, a peer device 301 can query the global LB module 340 through the respective LB query front-end module 345 regarding a specific network function of the distributed SDN packet core system 200. In response to such query, the global LB module 340 can select a specific regional pod 210 for serving the peer device 301 and send an indication thereof to the peer device 301. The LB query front-end module 345 can be configured to expose different protocols based on the type of the peer device 301. For example, the LB query front-end module 345 can expose a DNS interface for a peer device 301 that only knows how to use DNS resolution to select the connection address. For other peer devices 301 the LB query front-end module 345 can expose a HTTP(S) interface for peer devices 301 to query the global LB module 340 for a connection address.

The global LB module 340 can select the regional pod 210 based on the location of the peer device 301, current health (or operational) and load conditions of one or more regional pods 210 or a combination thereof. In some implementations, the global LB module 340 can be configured to maintain information indicative of the latency from each potential subnet block on the radio access network (e.g. for each/24 IPv4 subnet) to each regional pod 210. The global LB module can also be configured to receive information indicative of available capacity (or relative available capacity) for each regional pod 210, for instance, from the respective pod LB managers 330. For example, the relative available capacity for a given regional pod may be a number between 0 and 100, where 100 means that the regional pod 210 has full capacity and 0 means that the regional pod 210 is busy or is not operational and cannot serve requests. In some implementations, when a request is received from a peer device 301, the global LB module 340 can select the regional pod 210 with the lowest latency. If two regional pods 210 have similar latencies, the global LB module 340 can select regional pod 210 with the most available capacity. In some implementations, the global LB module 340 can be configured to select regional pods 210 based on a score defined as weighted sum of a latency metric and a pod capacity metric.

Once the peer device 301 is directed to a selected regional pod 210, finer grained load balancing can be performed locally within the selected regional pod 210. Local load balancing at the regional pod can include two load balancing levels. At a first level, a processing request (or data packets thereof) is received by the stateless LB module 320 of the selected regional pod 210. The stateless LB module 320 can be configured to retrieve one or more fields of received data packet (such as an IP 5-tuple) and use the retrieved fields to direct the received data packets to one of the available computing devices 115 in the regional pod 210. In some implementations, the stateless LB module 320 can select a computing device 115 within the regional pond 210 based on the supported network functions by each computing device 115, the operational states of one or more computing devices, the load states of one or more computing devices 115 or a combination thereof. In some implementations, the stateless LB module 320 can be configured to direct processing requests received from peer devices 301 to various computing devices 115 according to a round-robin pattern.

In some implementations, the stateless LB module 320 can be configured to determine whether the received data packets are associated with a stateless or stateful data packet processing task. If the stateless LB module 320 determines that the received data packets are associated with a stateless data processing task, the stateless LB module 320 can be configured to direct the data packets directly to a SDN element 311 configured to execute a respective stateless network function within the selected computing device 115. However, if the stateless LB module 320 determines that the received data packets are associated with a stateful data processing task, the stateless LB module 320 can direct the data packets to a stateful LB module 315 within the selected computing device 115. In general, the first level of local load balancing can be performed at a relatively high speed (e.g., compared to the second level of local load balancing) as the first level of local load balancing can be performed based on the IP connection fields of the data packets and as such does not involve complex parsing of the data packets.

Many packet processing tasks in the distributed SDN packet core system 200 are stateful and require tracking of one or more states across multiple data packets. Assigning the processing of data packets associated with a given communication session (or associated with a mobile device 20) and associated with a respective stateful data processing task to multiple computing device 115 in a regional pod 220 would result in a non-scalable local load balancing mechanism. In particular, such assignment results in each of the multiple computing devices 115 maintaining the state(s) of the data packets and would involve synchronization between the multiple computing devices 115. In some implementations, a particular computing device 115 in the regional pod 210 is designated to process data packets associated with a given communication session (or associated with a mobile device 20) and associated with a respective stateful data processing task and is referred to as the 'home host" for such data packets. For example, for LFE modules 212b, an example home host can be a computing device 115 that holds the state for a particular general packet radio service (GPRS) tunneling protocol (GTP) session. In some implementations, each computing device 115 in each regional pod 210 includes a respective stateful LB module 315 for directing incoming data packets to the "correct" home host. In some implementations, only a subset of the computing devices 115 in a regional pod 210 includes respective stateful LB modules 315. The stateful LB modules 315 in any regional pod 210 form a stateful LB layer that directs incoming data packets to respective home hosts. Upon receiving the data packets, the stateful LB module 315 of the selected computing device 115 can be configured to determine a computing device 115 for processing the data packets according to a stateful data packet processing task.

The stateful LB module 315 can be configured to parse complex packet headers (such as type-length-value (TLV) structures). In some implementations, parsing data packet headers can include the stateful LB module 315 decrypting the data packet headers, for instance, to determine an application identifier, session identifier or other header field parameter indicative of a specific application, data session or other feature associated with a respective stateful data processing task. Once, the stateful data packet processing task is determined, the stateful LB module 315 can determine a computing device 115 for applying the determined stateful data packet processing task to the data packets. In some implementations, the stateful LB module 315 can maintain and employ one or more data structures (such as lookup tables) for assigning computing devices 115 to process received data packets. In some implementations, the stateful LB module 315 can maintain a first lookup table that maps data packet field values to logical identifications (Logical IDs) indicative of SDN element(s) 311 (or respective network functions) and a second lookup table for mapping SDN element(s) 311 to respective hosting computing devices 115. In some implementations, the stateful LB module 315 can maintain a single lookup table that allows mapping data packet field values, indicative of stateful network functions to be applied to the data packets, directly to computing devices 115 hosting SDN elements 311 for performing the stateful network functions. In some implementations, if multiple computing devices 115 are determined to host SDN elements 311 for performing the network functions to be applied to data packets for session that is to be initiated, the stateful LB module 315 can select the computing device 115 that is operational (or healthy) and having the least processing load among the multiple determined computing devices 115. Once a computing device is assigned as the home host for a given communication session (or for a mobile device 20) involving a stateful data packet processing task, all data packets for that session (or mobile device 20) are directed to the assigned host home.

As an illustrative example, for data packets encapsulated according to the general packet radio service (GPRS) tunneling protocol (GTP), the stateful LB module 315 can be configured to de-capsulate the data packets to retrieve the tunnel end-point identification (TEID) from the GTP user plane (GTP-U) header. The stateful LB module 315 can then associate the TEID with a computing device 115 (such as a computing device 115 hosting a RAT-specific FE module 212 for processing the data packets). In some implementations, the process by which the stateful LB module 315 associates a data packet with a serving computing device 115 can be protocol specific.

The local load balancing mechanism applied at each regional pod 210 allows for moving the responsibilities (or network functions) of a first computing device 115 to a second computing device 115, for instance, in the case where the first computing device 115 has to be taken out of service. For example, if the first computing device 115 is down (due to some failure or for maintenance), the stateless LB module 320 can stop directing data traffic to the first computing device 115. Such data traffic can be directed, instead, to one or more other computing devices 115 configured to execute network functions previously executed by the first computing device 115. Such change in responsibilities (or tasks) assigned to separate computing devices 115 is internal within the regional pod and is not transparent to external peers 301.

Each regional pod 210 includes a pod LB manager 330 configured to collect health (or operational) and load information for various computing devices 115 and SDN elements 311 in that regional pod 210. Health (or operational) information includes information indicative of whether each SDN element 311 is operating normally or whether the computing device 115 is operational or down. Load information includes information such as computer processing unit (CPU) utilization, memory utilization, network link utilization, state of queues associated with SDN elements, processing time associated with various SDN elements, other factors or a combination thereof. The pod LB manager 330 can be configured to make such information available to the SDN elements 311, the stateless LB module 320, the stateful LB modules 315 or a combination thereof, for use in C-plane signaling and load balancing. For example, when a new session is established, the stateless LB module 320 or a stateful LB module 315 can direct the request (or data packets) for establishing such a session to a healthy (or operational) computing device 115 or SDN element 311 having the least processing load. If a first SDN element 311 is to request the services of a second SDN element 311, the first SDN element 311 can use the health and load information provided by the pod LB manager 330 to determine a healthy and least loaded instance of the second SDN element 311.

The pod LB manager 330 can be configured to signal cumulative health and load information for the regional pod 210 to the global LB module 340 for use when making pod selection decisions. The information signaled to the global LB module 340 can include information indicative of the operational status of the regional pod (such as operational or down), relative available processing capacity of the regional pod, relative available capacity for each computing device 115 in the regional pod 210 or a combination thereof. In some implementations, the pod LB manager 330 can be configured to signal detailed health and load information for the regional pod 210 to the global LB module 340, such as health and load information for each computing device 115 and each SDN element 311 in the regional pod 210. The global LB module 340 can be configured to collect health and load information from the various regional pods 210 and use the collected information to balance the processing loads among the regional pods 210 or to select one or more regional pods 210 to take over the load or portions of the load of another regional pod that is non-operational or has reduced availability (or reduced available capacity). In some implementations, for mobile devices 20 that are located between (or at the boundaries of) metropolitan areas served by separate regional pods 210, the global LB module 340 can be configured to direct data packets associated with such mobile devices 20 based on the health and load information of the regional pods 210.

The transport protocols referred to above for signaling between distinct SDN entities of a regional pod 210 can be implemented through remote procedure calls (RPCs). That is, messages between distinct SDN entities of a regional pod 210 can be signaled as validated RPCs without requiring special protocol layers (such as GTP, PMIPv6, etc.) for signaling or any additional layers for message validation (such as IPSec).

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A distributed software defined network (SDN) packet core system comprising:
   a plurality of interconnected local SDN infrastructure instances, each local SDN infrastructure instance including a cluster of computing devices arranged geographically in proximity to a respective plurality of radio access points and communicatively coupled to its respective plurality of radio access points, wherein each local SDN infrastructure instance is configured to execute latency sensitive network functions, and includes:
      a plurality of SDN network function modules representing instances of network functions executable by one or more of the computer devices;
      a stateless load balancer, comprising a processor, configured to receive data packets from the radio access points of the plurality of radio access points to which the SDN infrastructure instance is in geographic proximity for processing by at least one of the network functions and direct the data packets to one of the computing devices in the local SDN infrastructure instance;
      a plurality of stateful load balancing modules, each stateful load balancing module residing in a respective computing device and configured to:
      determine a stateful data packet processing task to be applied to a data packet received at the respective computing device;
      determine a computing device in the local SDN infrastructure instance for applying the determined stateful data packet processing task to the data packet; and
      forward the data packet to the determined computing device; and
      a load manager, comprising a processor, configured to manage information indicative of load and operational states of the computing devices and the plurality of SDN network function modules in the local SDN infrastructure instance.

2. The distributed SDN packet core system of claim 1, wherein the load manager is configured to collect load information indicative of at least one of computing resources use, memory use and network link use in the respective local SDN infrastructure instance.

3. The distributed SDN packet core system of claim 1, wherein the load manager is configured to collect information indicative of operational states of the SDN network function modules.

4. The distributed SDN packet core system of claim 1, wherein the load manager is configured to provide information indicative of cumulative operational and load states of the respective local SDN infrastructure instance to a cloud-based centralized load balancer of the distributed SDN packet core system, wherein the cloud-based centralized load balancer comprises a processor.

5. The distributed SDN packet core system of claim 1, wherein the stateless load balancer is configured to assign a data packet to a corresponding computing device based on one or more header fields of the data packet.

6. The distributed SDN packet core system of claim 1, wherein each stateful load balancing module is configured to maintain information indicative of stateful data packet processing tasks associated with each computing device of the local SDN infrastructure instance.

7. The distributed SDN packet core system of claim 6, wherein each stateful load balancing module is configured to:
    parse one or more fields of a received data packet;
    determine, based on the one or more fields and the information maintained at the stateful load balancing module, a computing device for handling a stateful data packet processing task associated with the received data packet; and
    forward the data packet to the computing device determined.

8. The distributed SDN packet core system of claim 1 further comprising a cloud-based global load balancer is configured to:
    receive a network processing request from an access network element; and
    assign the network processing request to a local SDN infrastructure instance based on load and operational states of one or more local SDN infrastructure instances.

9. The distributed SDN packet core system of claim 8, wherein the cloud-based global load balancer is configured to assign the network processing request to a local SDN infrastructure instance based on a latency metric.

10. The distributed SDN packet core system of claim 8, wherein the cloud-based global load balancer is configured to assign the network processing request to a local SDN infrastructure instance based on a capacity metric.

11. A method of load balancing in a distributed software defined network (SDN) packet core system, comprising:
    receiving, by a stateless load balancer within a local SDN infrastructure instance of the distributed SDN packet core system, a data packet for processing from one of a plurality of radio access points by at least one of a plurality of SDN network function modules, wherein the stateless load balancer comprises a processor and the local SDN infrastructure instance is configured to execute latency sensitive network functions, the plurality of SDN network function modules executable on a plurality of computing devices of the local SDN infrastructure instance, the plurality of computing devices arranged geographically in proximity to the plurality of radio access points and communicatively coupled to the plurality of radio access points;
    directing, by the stateless load balancer, the data packet to a stateful load balancer residing on a first computing device, among the plurality of computing devices in the local SDN infrastructure instance;
    determining, by the stateful load balancer, a stateful data packet processing task to be applied to the data packet;
    determining, by the stateful load balancer, a second computing device in the local SDN infrastructure instance for applying the determined stateful data packet processing task to the data packet; and
    forwarding, by the stateful load balancer, the data packet to the second computing device.

12. The method of claim 11 further comprising collecting, by a load manager of the local SDN infrastructure instance, load information indicative of at least one of computing resources use, memory use and network link use in the respective local SDN infrastructure instance, wherein the load manager comprises a processor.

13. The method of claim 11 further comprising collecting, by a load manager of the local SDN infrastructure instance, information indicative of operational states of the SDN network function modules, wherein the load manager comprises a processor.

14. The method of claim 11 further comprising providing, by a load manager of the local SDN infrastructure instance, information indicative of cumulative operational and load states of the respective local SDN infrastructure instance to a cloud-based centralized load balancer of distributed SDN packet core system, wherein the load manager and centralized load balancer each comprises a processor.

15. The method of claim 11, wherein directing the data packet to a stateful load balancer includes directing the data packet based on one or more header fields of the data packet.

16. The method of claim 11 further comprising maintaining, by the stateful load balancer information indicative of stateful data packet processing tasks associated with each computing device of the local SDN infrastructure instance.

17. The method of claim 16 further comprising:
    parsing, by the stateful load balancer, one or more fields of a received data packet;
    determine, based on the one or more fields and the information maintained at the stateful load balancer, the second computing device for handling a stateful data packet processing task associated with the received data packet; and
    forwarding the data packet to the second computing device.

18. The method of claim 11 further comprising:
    receiving, by a cloud-based centralized load balancer of distributed SDN packet core system, a network processing request from an access network element, wherein the cloud-based centralized load balancer comprises a processor; and
    assigning, by the cloud-based centralized load balancer, the network processing request to a local SDN infrastructure instance based on load and operational states of one or more local SDN infrastructure instances.

19. The method of claim 18 further comprising assigning, by the cloud-based global load balancer, the network processing request to a local SDN infrastructure instance based on a latency metric.

20. The method of claim 18 further comprising assigning, by the cloud-based global load balancer, the network processing request to a local SDN infrastructure instance based on a capacity metric.

* * * * *